(12) United States Patent
Mazziotti et al.

(10) Patent No.: US 7,097,565 B2
(45) Date of Patent: Aug. 29, 2006

(54) FIXED-CENTER ARTICULATING CONSTANT VELOCITY JOINT

(75) Inventors: Philip J. Mazziotti, Toledo, OH (US); Ray A. Gall, Curtice, OH (US)

(73) Assignee: Torque-Traction Technologies, LLC, Maumee, OH (US)

( * ) Notice: Subject to any disclaimer, the term of this patent is extended or adjusted under 35 U.S.C. 154(b) by 70 days.

(21) Appl. No.: 10/945,209

(22) Filed: Sep. 20, 2004

(65) Prior Publication Data

US 2006/0030414 A1 Feb. 9, 2006

Related U.S. Application Data

(60) Provisional application No. 60/600,036, filed on Aug. 9, 2004.

(51) Int. Cl.
*F16D 3/202* (2006.01)
(52) U.S. Cl. .................. 464/120; 464/125; 464/904; 464/905
(58) Field of Classification Search ........ 464/120–123, 464/125, 904, 905
See application file for complete search history.

(56) References Cited

U.S. PATENT DOCUMENTS

| 2,685,784 | A | * | 8/1954 | Wildhaber ................. 464/905 |
| 2,691,876 | A | | 10/1954 | Wildhaber |
| 5,417,612 | A | | 5/1995 | Ide |
| 5,647,800 | A | | 7/1997 | Warnke et al. |
| 6,120,381 | A | | 9/2000 | Orain et al. |
| 6,878,068 | B1 | * | 4/2005 | Bigelow et al. ............ 464/905 |
| 2003/0224860 | A1 | * | 12/2003 | Yun .......................... 464/125 |

* cited by examiner

*Primary Examiner*—Aaron Dunwoody
(74) *Attorney, Agent, or Firm*—MacMillan, Sobanski & Todd, LLC

(57) ABSTRACT

A fixed center constant velocity joint includes an outer race having races formed with a spherical surface, a shaft, a driver connected to the shaft and including radially directed pivot shafts, first and second bipods each located on an opposite axial side of the driver and including radially directed trunnions, equalizers fitted on a pivot shaft and driveably connected to the first and second bipods for pivoting the bipods relative to one another, and bearings rotatably supported on a trunnion and including a spherical surface conjugate to and engaged with a surface of a race.

12 Claims, 6 Drawing Sheets

FIXED-CENTER ARTICULATING CONSTANT VELOCITY JOINT

CROSS-REFERENCE TO RELATED APPLICATIONS

This application claims the benefit of U.S. Provisional Application No. 60/600,036, filed Aug. 9, 2004, the disclosure of which is incorporated herein by reference.

BACKGROUND OF THE INVENTION

Equalizer constant velocity joints, which articulate or have angular displacement, can be either sliding joints, in which translational displacement occurs with a low sliding force, or fixed joints having no translational displacement. These joints use many of the same components and are specially suited for vehicle longitudinal drives. Their low friction characteristics, resulting from operating angles and longitudinal sliding, make equalizer constant velocity joints better suited to work well at high speeds than the constant velocity ball type joints used in wheel drive applications. Ball type joints operate at a lower speed and articulate through large angles in outboard joints in front wheel drive vehicle applications.

The fixed joint of this invention can be used in combination with a sliding joint, such as that disclosed in U.S. Pat. No. 6,120,381. The fixed joint of this invention functions similarly to the sliding joint, and can be used in both slip and fixed joint constructions, provided the outer race is suitably modified.

Equalizer constant velocity joints can be used in wheel drive applications in place of conventional ball type constant velocity joints. The fixed joint does not have the high angle capability for outboard steering angles required for front wheel drive applications.

Equalizer universal joints provide all of the desired characteristics that longitudinal drives provide for smooth, vibration-free operation. For example, constant velocity is produced with only the low inertia components turning non-uniformly when operating at an angle, and inertia forces are cancelled by out-of-phase motion. The joint's inherently low friction characteristics produce lower operating temperatures and longer life in high-speed drive applications. There is virtually no sliding friction due to length changes.

An assembly comprising a combination of a fixed joint and a sliding joint eliminates centering problems that could result if a slip joint were located at each end of the assembly. The fixed joint of this invention eliminates oscillating secondary couple loads at supports, as in fixed non-constant velocity joints, when transmitting torque through a joint angle. Many components of the sliding constant velocity joint described in U.S. Pat. No. 6,120,381 are identical to those of the fixed constant velocity joint of this invention, which would reduce the production cost of an assembly that includes in combination a fixed joint of this invention and a slip joint.

SUMMARY OF THE INVENTION

The invention relates to a fixed equalizer constant velocity joint. Axial motion is supported by spherical contact between bearing races and a spherical raceway. The construction allows the same internal parts to be used with a fixed joint having a spherical raceway and a slip joint having a cylindrical raceway.

An equalizer constant velocity joint may include the following components. An outer member, which is attached to a drive member or a driven member as in a universal joint, containing four drive raceway grooves to fit the drive face of bearing races and to roll freely when transmitting torque at an angle. The bottom of the raceways has a cylindrical shape for a slip joint and a spherical shape for a fixed joint. It also has four grooves for clearance around bipod and equalizer caps.

Two bipods having two trunnions each provide a rotating bearing race to transmit torque to a cross, and to support a face of the bearings in the raceways. Bipods also have four lugs with grooves engaged by the equalizers. This provides small angular changes during rotation of an articulated universal joint. The construction produces low friction and requires a low separating force. The two bipods are used with bearings arranged at right angles to each other while the bearings are on same centerline of action.

Four equalizers with ends that fit into slots in the bipods allow angle changes as the bipods rotate non-uniformly. The center of the equalizers acts as a bearing race on a cross member located between the bipods and is attached to an inner member for transmitting equalized constant velocity of the inner member.

A cross member with four trunnions fits the center of the equalizers and is attached to the inner member. An inner member is attached to the cross member to support the bipods, which are free to oscillate in rotating directions at an operating angle.

A fixed-center constant velocity joint according to this invention that provides these advantages includes an outer race component having angularly spaced races each formed with a spherical surface. The outer race can be connected externally to rotating shaft, and a second rotating shaft, fitted within the outer race, supports components of the CV joint. A driver connected to the second shaft includes radially directed pivot shafts. First and second bipods, located on opposite axial sides of the driver, include radially directed trunnions, which are angularly spaced from the pivot shafts. Equalizers, each fitted on a pivot shaft and driveably connected to the first and second bipods, pivoting the bipods relative to one another in response to articulation of the shafts connected by the joint. Bearings, each rotatably supported on a trunnion, include a spherical surface that is conjugate to and engaged with a spherical surface of each race. The surface of each race has the form of a concave, truncated sphere. Each bearing has a surface facing a race and having the form of a convex, truncated sphere.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 9:
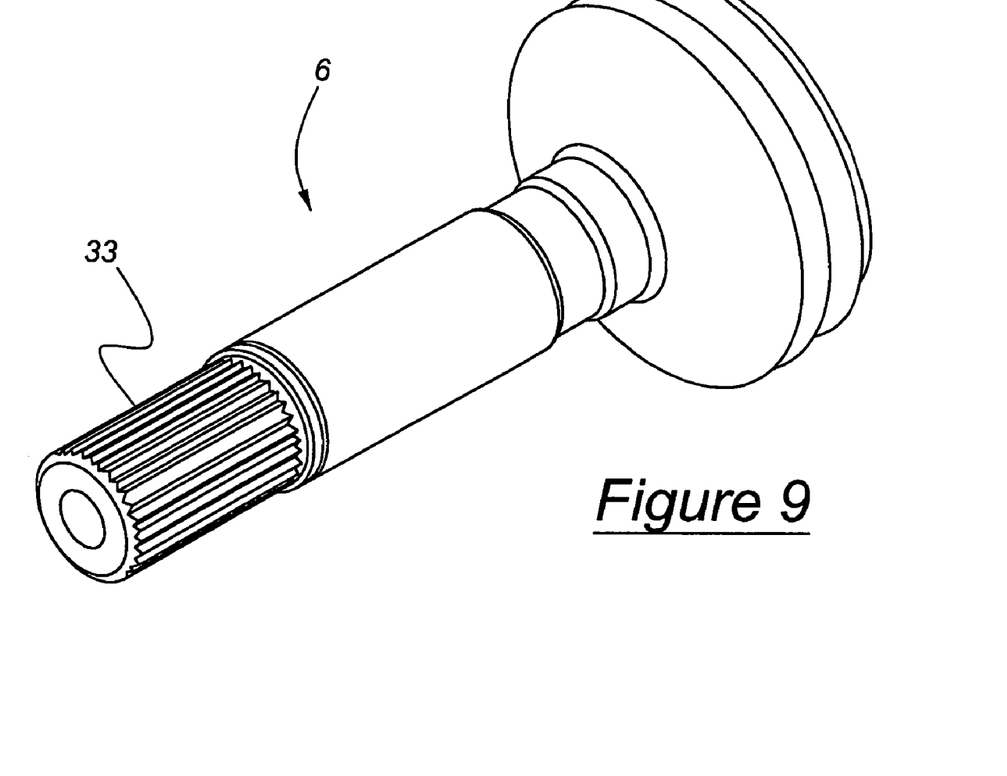
FIG. 9 is an isometric view of a shaft for use with the constant velocity joint of FIG. 1.

Referring now to the drawings, there is illustrated in FIGS. 1–4 a fixed center constant-velocity joint 1, which includes an outer race 2 having an inner peripheral wall 3, four identical arcuate races 4, each race being open inwardly, and having a radial symmetry plane 5 at right angles to the radial symmetry plane 5 of the adjacent races 4. The outer surface of each race 4 is a truncated concave spherical surface. A shaft 6, which may be the tube shaft of a driveshaft assembly for a motor vehicle, is formed with a spline (shown in FIG. 9), by which a driver or cross 8 is removeably secured to the shaft 6. The cross 8 supports on its trunnions several equalizers 9, which pivot in relation to the trunnions about respective radial axes 10, which are perpendicular to the axis 10 of the adjacent equalizers 9 and aligned with the axis of the diametrically opposite trunnion.

Figure 1:
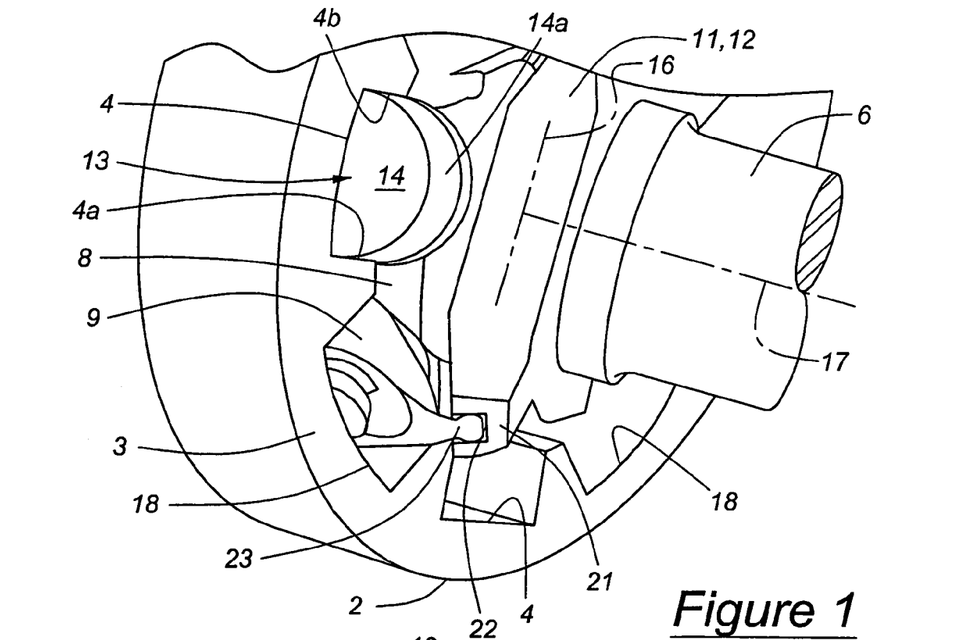
FIG. 1 is an isometric side view of a constant velocity joint according to this invention attached to a shaft that is articulated with respect to the axis of the outer race.
Figure 2:
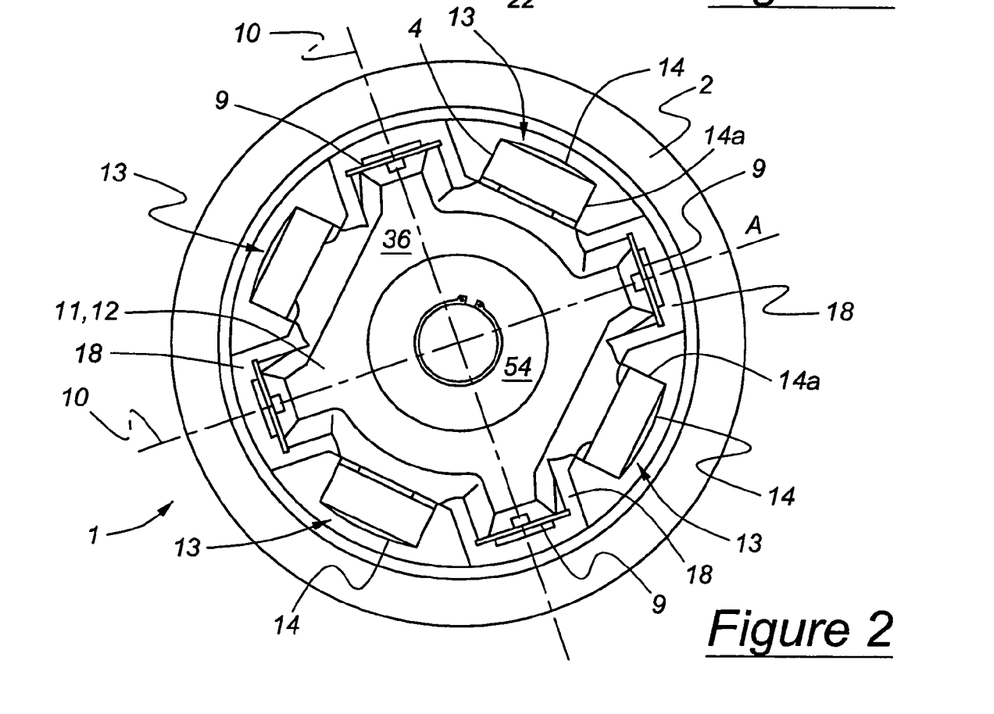
FIG. 2 is an end view of the axially opposite side of the joint of FIG. 1 with the shaft aligned with the axis of the outer race.
Figure 3:
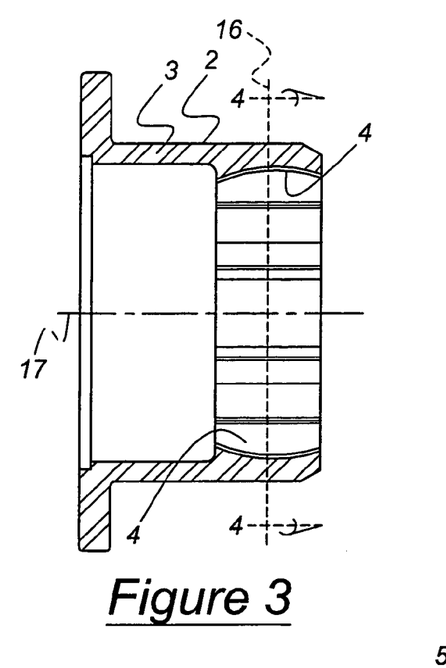
FIG. 3 is a cross section of the outer race of a fixed joint taken at a diametric plane.
Figure 3A:
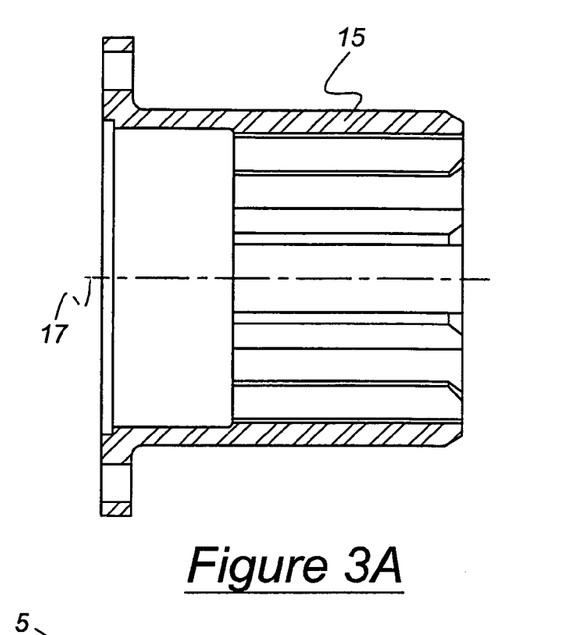
FIG. 3A is a cross section of the outer race of a slip joint taken at a diametric plane.
Figure 4:
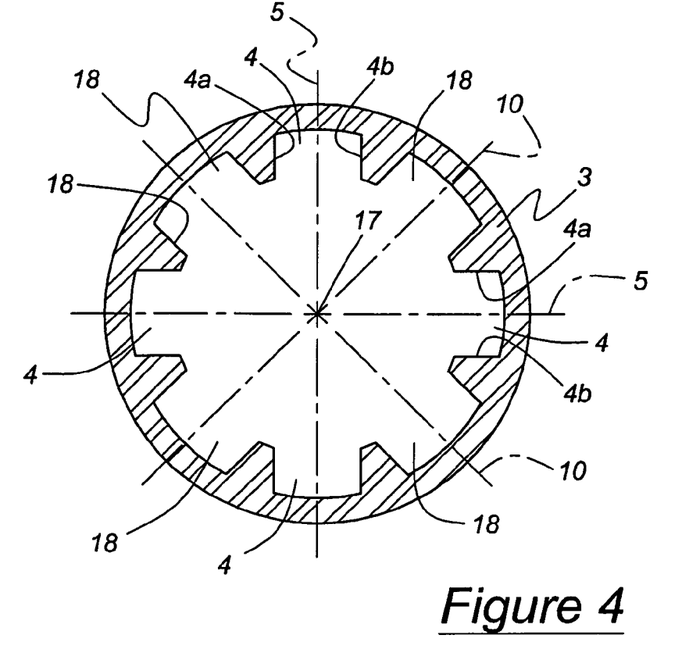
FIG. 4 is a cross section of the outer race taken at the lateral plane 4—4 of FIG. 3 or FIG. 3A.
Figure 12:
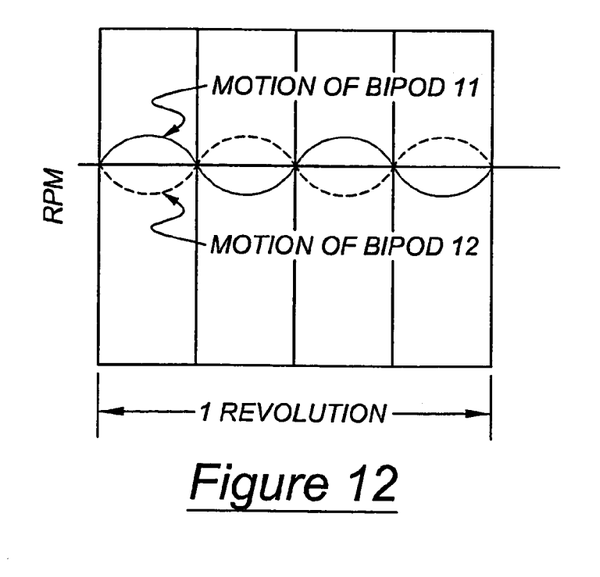
FIG. 12 is a graph that illustrates the phase relationship and variation of rotational speed of two bipods of a fixed joint according to this invention during one revolution.

Two bipods 11, 12, one located at each axial side of the cross 8, pivot about the axis 17 of the shaft 6. Each bipod 11, 12 has two radially aligned trunnions that carry a bearing 13 having a spherical bearing surface 14 with a profile complementary to that of the corresponding race 4. The concave spherical surface of the race 4 and the conjugate convex spherical surface 14 of the bearing 13 allow the bearing to slide relative to the race 4. The axes 5 of the bearings 13 are located in the same plane 16 and perpendicular to the axis 17 of the shaft 6. The equalizers 9 are arranged so that the two bipods 11, 12, in relation to the cross 8, are always in respective pivoted positions corresponding to the same pivot angle in opposite directions FIG. 3A shows the similarity of the outer race 15 of a slip joint compared to the outer race 2 of the fixed joint of FIG. 3. The outer race of the fixed joint could be shorter or the same length as that of the slip joint, which is determined by the required axial slip capability. The raceway of the slip joint is cylindrical. FIG. 12 illustrates the phase relation and the variation of rotational speed of the two bipods during one revolution while the input rotates at constant velocity. The output speed is the same speed as that of the input after equalizing motion of the first and second bipods. The equalizer connections to the bipods provide constant velocity to the output.

The inner peripheral wall 3 of the outer race 2 has four angularly spaced recess grooves 18 that open inwardly and are each disposed on a diagonal between two adjacent races 4. The cross 8 is formed with four radially directed arms 19, each arm spaced angularly from an adjacent arm at 90 degree intervals. Each arm is formed with a pivot shaft 20 on which an equalizer 9 is supported. The surface of the hub of the cross 8 is formed with internal splines that engage the external splines 33 on the outer surface of the tube 6.

The races 4 have two tracks 4a and 4b, which are planar surfaces, parallel to the corresponding radial symmetric planes 5 and are disposed opposite to and facing one another. Between the parallel tracks 4a and 4b of each race 4 and the lateral surface 14a of the corresponding bearing 13 there is a clearance, shown in FIG. 1, sufficient to allow the free passage of the bearing 13 between the two tracks 4a and 4b.

Figure 5:
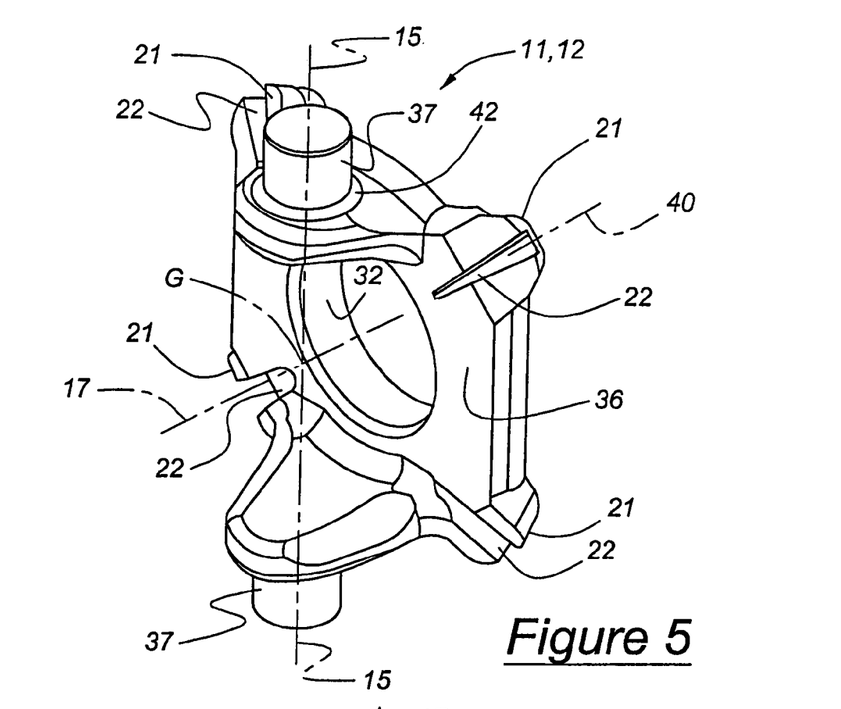
FIG. 5 is an isometric view of a bipod.
Figure 6:
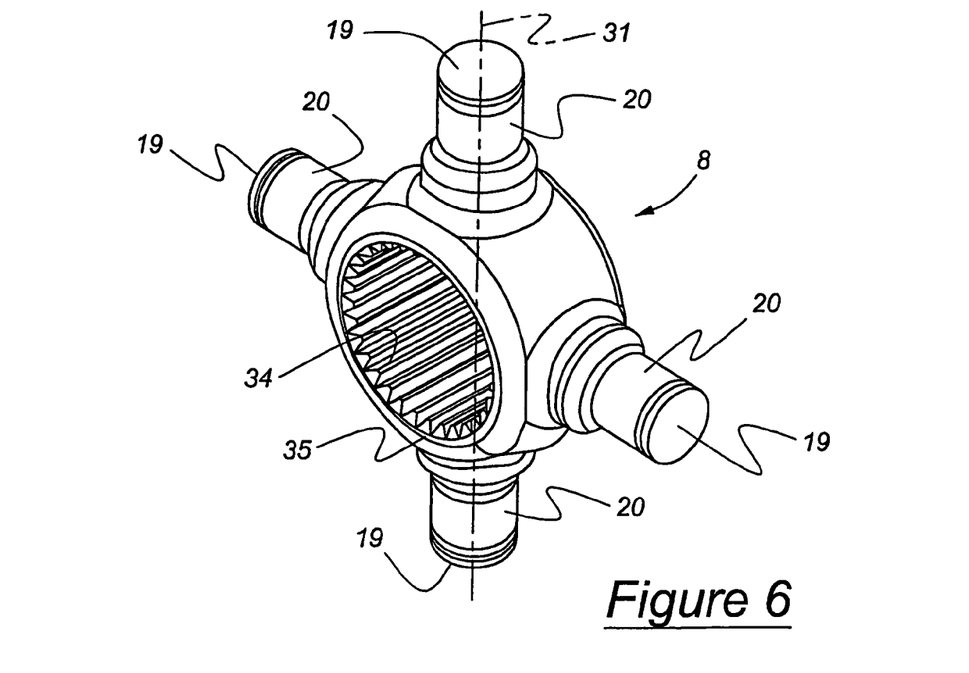
FIG. 6 is an isometric view of the driver or cross.

As FIG. 5 shows, each bipod 11, 12 has four radial lugs disposed mutually perpendicular and at 45 degrees relative to the axis 15 of the bearings 13 carried by the bipods 11, 12 arms. Each lug 21 has, on the axially inner surface facing the cross 8, a slot 22 designed to receive an associated end 23 of the corresponding equalizing lever 9. The recess grooves 18 of the outer race are dimensioned to avoid contact with the radial lugs 21 of the bipods 11, 12 and with the equalizing levers 9. The opposite radial ends 23 of each equalizer 9 is formed with a tapered surface and a terminal key, which slides into the inner tapered slots 22 of the bipod lugs 21. In this way, the two bipods 11, 12 are continually connected to the ends 23 of the equalizers 9, which are arranged to keep the inner surface of each bipod 11, 12 at a distance from the cross 8 in order to avoid any contact between each bipod and the cross 8.

The two bipods 11, 12 preferably are identical. They are centered radially in relation to one another by the shaft 6, whose axis is the common axis of the two bipods 11, 12. The two bipods 11, 12 pivot simultaneously at the same angle in opposite directions about the axis 17 of the outer race 2. An axial clearance is provided between the respective inner surfaces of the bipods 11, 12 and the cross 8. The bipods 11, 12 are kept apart from one another in the direction of the axis 17 by the ends 23 of the equalizers 9, each end 23 of an equalizer being engaged in the slots 22 of the bipods 11, 12.

Figure 10:
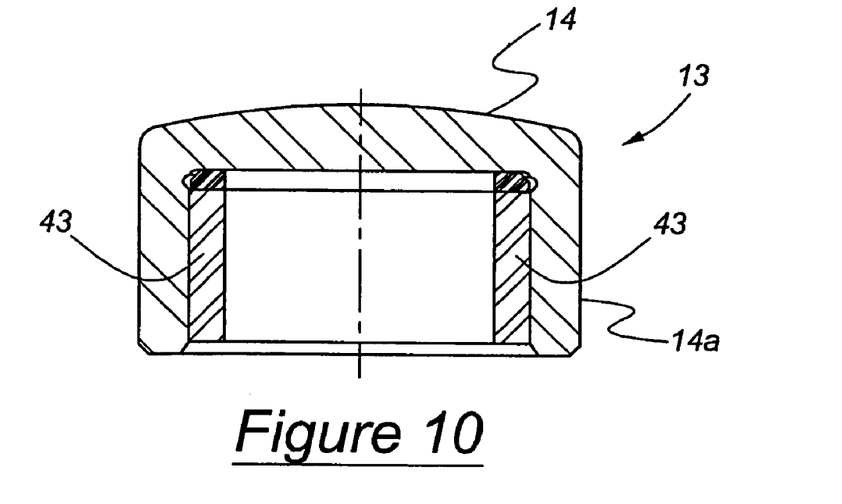
FIG. 10 is a cross section of a bearing assembly taken at a diametric plane through the longitudinal axis.

FIG. 10 shows that each bearing 13 has a radially outer, convex, truncated spherical surface 14 and a lateral surface 14a that is circular and cylindrical. The longitudinal grooves 18 that extend in the direction of the axis 17 of the outer race 2 have sufficient radial depth and transverse width to ensure, particularly in the outward radial direction, the free deflection of the radial lugs 21 that project from the moving assembly that includes the cross 8, bipods 11, 12 and shaft 6 for the full range of articulation of the shaft 6 relative to the outer race 2.

Figure 7:
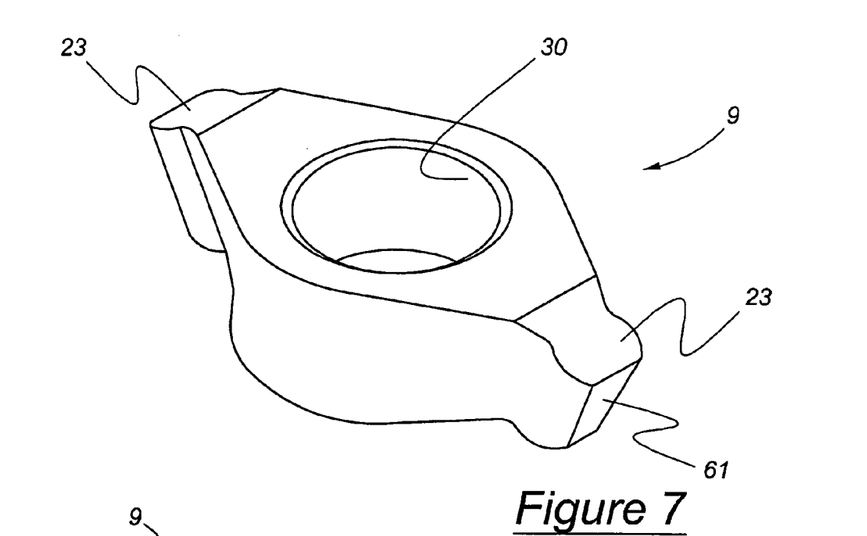
FIG. 7 is an isometric view of an equalizer.
Figures 8A, 8B:
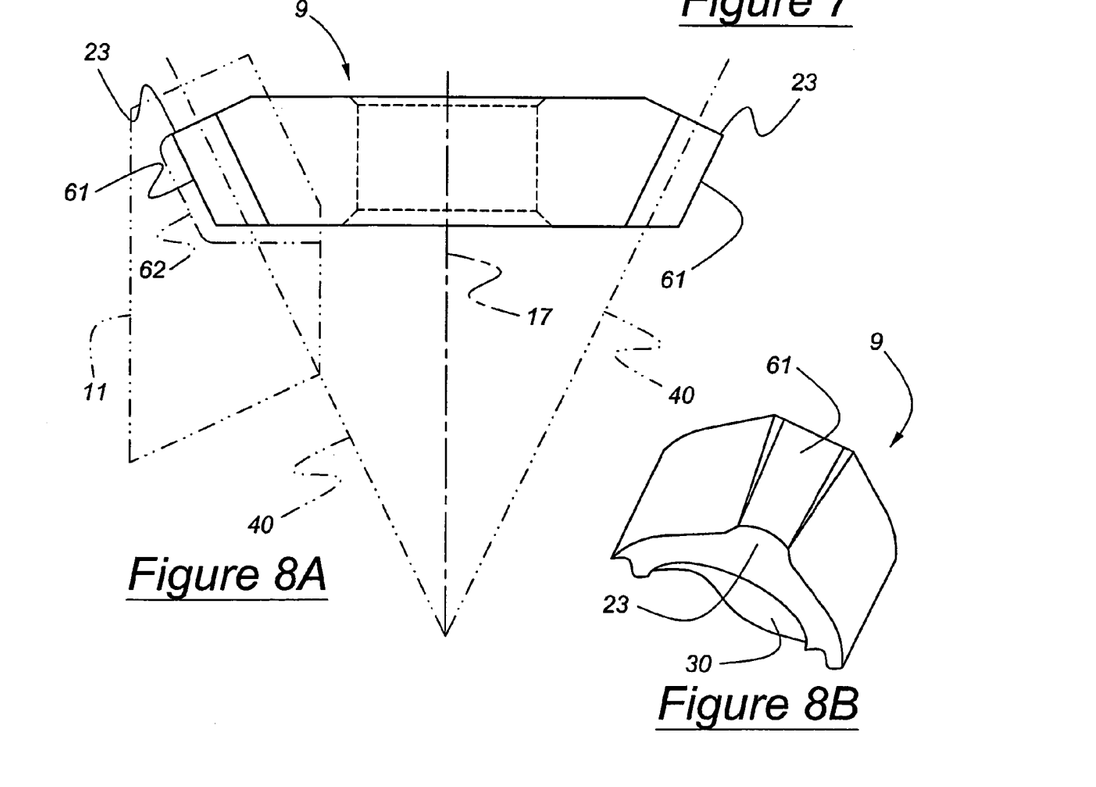
FIG. 8A is a front view of the equalizer of FIG. 7.
FIG. 8B is an isometric view facing the land of a portion of the equalizer of FIG. 8A.

Referring now to FIGS. 7 and 8, each equalizer 9 is pivotably supported about a pivot shaft 20 on an arm 19 of the cross 8, by fitting the central bore 30 of each equalizer 9 over a pivot shaft 20. The equalizers 9 pivot slightly on the pivot shafts 20. In this way, the two bipods 11, 12 can pivot in relation to one another about the axis 17 and only about this axis. The two bipods 11, 12 are maintained precisely parallel to one another and in a plane 16 perpendicular to axis 17. The two bipods 11, 12 are always kept rigorously parallel to the median plane 31 of the cross 8. Each bipod 11, 12 has a central bore 32. The outer surface of the shaft 6 has splines 33 that pass freely within the bores 32 of the bipods to provide direct radial guidance of the bipods. The splines 33 of the shaft 6 engage without clearance the complementary splines 34 located on the inside of the central opening 35 of the cross 8.

Referring again to FIG. 5, each bipod 11, 12 includes a generally square main plate 36 having a central opening 32 and two radially directed trunnions 37 extending in opposite direction from the bore. Each trunnion carries a bearing 13, which turns about the axis 15 of the trunnion 37. The common axis 15 of the trunnions 37 and of the bearings 13 is offset axially, i.e., along the axis 17, toward the other bipod 12 or 11 in order to provide the space necessary between the two bipods 11, 12 for the cross 8, the median plane 31 of which in the assembled position contains the axes 15 of the four bearings 13. The trunnions 37 of bipod 11 are angularly spaced about axis 17 by 90 degrees from the trunnions of bipod 12.

The main plate of each bipod 11, 12 has on each radial lug 21 a slot 22 with an inside profile in the form of a hollow tooth. The ends 23 of the equalizing levers 9 have an outside profile in the form of a tooth conjugate with the inside profile of the slots 22. Each slot 22 has an inclined axis 40 that converging to a point B where the axis 17 of the shaft 6 and the axis 15 of the bearings intersect. The slots 22 or teeth are set in radial planes, which make an angle of 45 degrees with the axis 15 of the bearings 13 and trunnions 37, when viewed along axis 17. Recesses reduce the thickness of the plate 36 toward the end of the slots 22. The trunnions 37 advantageously have at their base a shoulder 42 which serves both to connect the trunnion 37 with the plate 36 and to hold and inwardly retain rollers 43, located inside the bearings 13 and contacting the surface of trunnions 37.

The two ends 23 of each equalizer 9 have an outside profile in the shape of a tooth conjugate with the inside profile of the bipod slots 22, shown in FIGS. 5 and 8. The teeth 23 engage the inside of the tapered or trapezoidal slots 22. Each tooth 23 also has an inclined axis that essentially coincides with the axis 40 of the corresponding bipod slot 22, and converges to the same point B where the axis 17 of the shaft 6 intersects the common axis 15 of the two bearings 13 on the corresponding bipod. The top land 61 of the tooth 23 does not contact the bottom land 62 of the corresponding slot 22, so that the only contact between the equalizer 9 and the corresponding bipod 11, 12 is between the circular concave side walls of the tooth 23 and the tapered side walls 22*a* and 22*b* of the corresponding slot 22.

Retaining disc 54 is seated on the outer axial surface of plane 36 of a bipod 11, 12 and is secured to the shaft 6 preferably by a snap ring connection. The retaining disc 54 retains the assembly consisting of the two bipods 11, 12 and the cross 8 in the axial position on the shaft 6.

The constant-velocity joint 1 may preferably be assembled by first mounting the axially inner bipod 11 equipped with its two bearings 13 on the shaft 6. Then connect the inner retaining ring 54 to shaft 6. Seat the cross 8 on the splines 33 of the shaft 6 and bring it to bear axially against the retaining ring 54. The teeth 23 of the equalizers 9 are inserted into the corresponding slots 22 of the bipod 11. Then install the second bipod 12 and secure it to the opposite ends of the equalizers 9.

Figure 11:
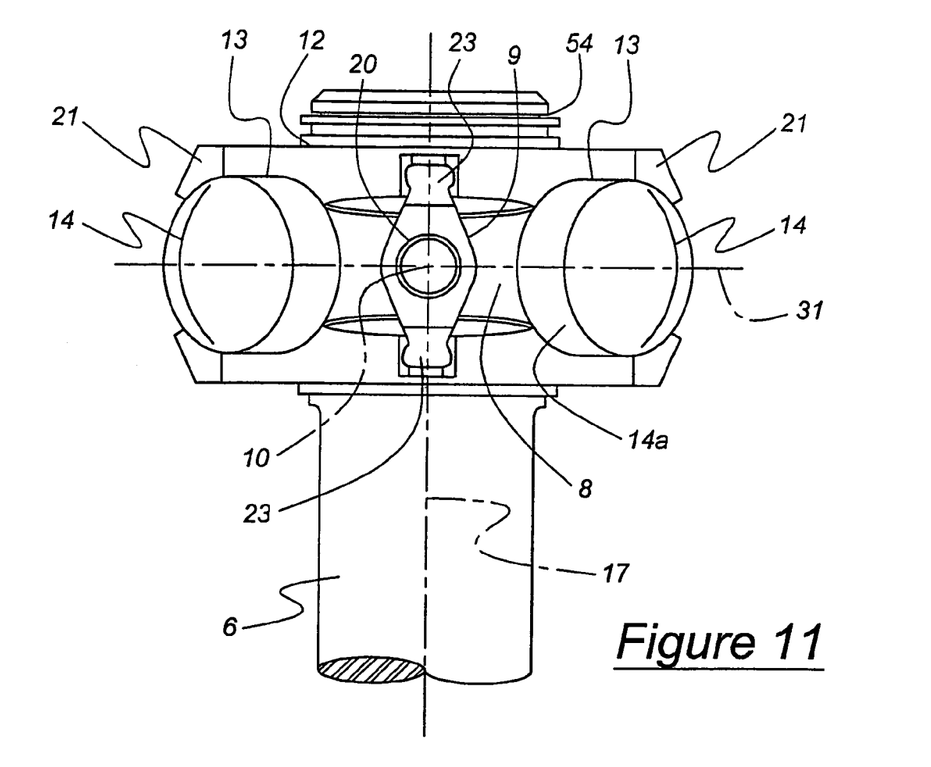
FIG. 11 is an side elevation of a constant velocity joint assembly viewed in the direction of the arrow A of FIG. 2 and showing a cross, two bipods, and an equalizer.

The assembly shown in FIG. 11 includes the two bipods 11, 12 located on axially opposite sides of the cross 8, one of the four equalizing levers 9 pivoting about a pivot shaft 20 of the cross 8 and meshing with and engaged with the two bipods 11, 12. The bearings 13 are supported on trunnions 37 of the bipods 11, 12.

The concave spherical surface of the race 4 and the conjugate convex spherical surface 14 of the bearing 13 allow the joint 1 to articulate because the bearings 13 slide relative to the race 4 as the shaft 6 pivots relative to the outer race 2. But the bearings 13 are retained within the races against linear displacement by the mating contact of the conjugate spherical surfaces. Consequently, joint 1 is a fixed center joint incapable of rectilinear displacement.

Preferably, the mean lever arm of the slots 22 in relation to the axis 17 of the shaft 6 is essentially equal to the mean lever arm of the bearings 13 to the axis 17. Preferably, the lever arm and the dimensions of each tooth 23 are arranged so that the contact pressure does not exceed the pressure applied to the trunnions 37 of the bipods 11, 12 when the same magnitude of torque is transmitted by the joint.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fixed center constant velocity joint comprising:
   an outer race having a first axis, including races spaced angularly about the first axis, each race being formed on the outer race with a spherical surface;
   a shaft having a second axis;
   a driver driveably connected to the shaft and including pivot shafts radially directed from the second axis;
   first and second bipods secured to the shaft, each bipod located on an opposite axial side of the driver and including radially directed trunnions;
   equalizers located on the driver, each equalizer fitted on a pivot shaft and driveably connected to the first and second bipods for pivoting the bipods relative to one another; and
   bearings located on the driver, each bearing being rotatably supported on a trunnion, and including a spherical surface that is complementary to and engaged with the spherical surface of the race, thereby limiting axial displacement of the shaft relative to the outer race.

2. The constant velocity joint of claim 1, wherein the races each include an inner surface located at a radial end of a respective trunnion and facing the first axis, each surface of a race having the form of a concave, truncated sphere; and wherein the bearings each include a surface facing an inner surface and having the form of a convex, truncated sphere.

3. The constant velocity joint of claim 1, wherein surfaces of the races have a common center located on the first axis.

4. The constant velocity joint of claim 1, wherein the outer race further comprises grooves directed along the first axis, each groove located angularly between two adjacent races, a pivot shaft and equalizer being located in each groove.

5. A fixed-center constant velocity joint comprising:
   an outer race having a first axis, and including a peripheral wall and four races spaced angularly about the first axis, each race having a spherical surface facing the first axis and disposed on a diagonal between two adjacent races;
   a shaft having a first axis;
   a driver secured to the shaft and including four radially directed, angularly spaced pivot shafts, each pivot shaft being perpendicular to an adjacent pivot shaft;
   first and second bipods, each bipod located on an opposite axial side of the driver, and including two radially directed diametrically opposite trunnions, and four lugs spaced angularly about the first axis, disposed perpendicular to adjacent lugs and spaced angularly about the first axis at 45 degrees from an axis of a trunnion, each lug having a slot on a surface facing the driver;
   bearings having radial axes located in a plane that is perpendicular to the first axis, each bearing including a spherical surface that is complementary to and engaged with the spherical surface of an associated one of the races;
   four equalizers, each equalizer being carried on a pivot shaft for pivoting about a respective radial axis, including a first end secured to the first bipod in a slot of a lug of the first bipod, a second end secured to the second bipod in a slot of a lug of the second bipod, the equalizers being arranged so that the first and second bipods in relation to the driver are in respective pivoted positions corresponding to a pivot angle in opposite directions.

6. The constant velocity joint according to claim 5, wherein each race includes two plane, mutually facing parallel surface located in a corresponding radial symmetry plane, and wherein each bearing includes a lateral surface having a circular, cylindrical contour.

7. The constant velocity joint according to claim 5, wherein the slots have inside surfaces in the form of a tapered slot; and wherein the first and second ends of each equalizer have the form of a tooth having outer surfaces that fit into the tapered slot.

8. The constant velocity joint according to claim 7, wherein each slot has a length directed radially toward and axially along the first axis, and the inside surfaces define a width that decreases continually along the length toward the first axis; and wherein each tooth has a length and a thickness that decreases along the length, the outer surfaces contacting the inner surfaces of a respective slot, whereby each tooth engages a slot of a bipod.

9. The constant velocity joint according to claim 7, wherein each slot and each tooth has an inclined axis converging to a point where the first axis and the axis of the trunnions of the corresponding bipod intersection.

10. The constant velocity joint according to claim 5, wherein the first and second bipods are secured mutually against relative axial displacement by engagement of a first end of each equalizer in a slot of the first second bipod and by engagement of a second end of each equalizer in a slot of the second bipod to allow a simultaneous pivoting of the two bipods at the same angle in opposite directions about the first axis.

11. The constant velocity joint according to claim 5, wherein a length of a mean lever arm from a slot to the first axis is substantially equal to a length of a mean lever arm from a bearing to the first axis.

12. A fixed center constant velocity joint comprising:
an outer race defining an axis and including a plurality of races having respective spherical surfaces;
a driver including a plurality of pivot shafts;
first and second bipods supported on said shaft on opposite sides of said driver, each of said first and second bipods including a pair of trunnions;
an equalizer supported for pivoting movement on each of said pivot shafts, each of said equalizers including a first end that engages said first bipod and a second end that engages said second bipod; and
a bearing supported on each of said trunnions, each of said bearing including a spherical surface that is complementary to and engaged with an associated one of said spherical surfaces provided on said plurality of races to limit axial displacement of said driver relative to said outer race.

* * * * *